(12) United States Patent
Cholleton

(10) Patent No.: US 10,812,449 B1
(45) Date of Patent: Oct. 20, 2020

(54) METHOD FOR GENERATING A DOMAIN NAME USING A LEARNED INFORMATION-RICH LATENT SPACE

(71) Applicant: VERISIGN, INC., Reston, VA (US)

(72) Inventor: Aubry Cholleton, Vaud (CH)

(73) Assignee: VERISIGN, Reston, VA (US)

( * ) Notice: Subject to any disclaimer, the term of this patent is extended or adjusted under 35 U.S.C. 154(b) by 0 days.

(21) Appl. No.: 16/135,894

(22) Filed: Sep. 19, 2018

(51) Int. Cl.
*H04L 29/12* (2006.01)
*G06N 3/02* (2006.01)
*G06F 40/126* (2020.01)

(52) U.S. Cl.
CPC ........ *H04L 61/3025* (2013.01); *G06F 40/126* (2020.01); *G06N 3/02* (2013.01); *H04L 61/1511* (2013.01)

(58) Field of Classification Search
CPC ............. H04L 61/3025; H04L 61/1511; G06F 17/2217; G06N 3/02
USPC ........................................................ 709/245
See application file for complete search history.

(56) References Cited

U.S. PATENT DOCUMENTS

| 2015/0058330 | A1* | 2/2015 | Carroll | ................ | H04L 61/3025 707/723 |
| 2016/0232440 | A1* | 8/2016 | Gregor | ................ | G06N 3/0445 |
| 2016/0247061 | A1* | 8/2016 | Trask | ........................ | G06N 3/04 |
| 2017/0171151 | A1* | 6/2017 | Raemy | .................... | G06Q 30/02 |
| 2017/0351953 | A1* | 12/2017 | Raemy | .................... | G06N 3/088 |
| 2019/0273510 | A1* | 9/2019 | Elkind | .................... | G06N 20/00 |
| 2019/0361870 | A1* | 11/2019 | Lai | ........................ | G06F 16/2365 |

OTHER PUBLICATIONS

Otto Fabius et al., "Variational Recurrent Auto-Encoders", Retrieved from the Internet: https://arxiv.org/pdf/1412.6581.pdf, Dec. 2014, pp. 1-5.
Samuel R. Bowman et al., "Generating Sentences from a Continuous Space", Retrieved from the Internet: https://arxiv.org/pdf/1511.06349.pdf, Nov. 2015, pp. 1-12.

* cited by examiner

*Primary Examiner* — James E Springer
(74) *Attorney, Agent, or Firm* — MH2 Technology Law Group LLP

(57) ABSTRACT

A computer device, a computer-readable medium and a computer-implemented method is provided. The computer device and the computer-readable medium perform the computer-implemented method of generating unregistered internet domain names using a trained encoder function and a trained decoder function. The method includes obtaining one or more seed domain names; mapping, using a hardware processor implementing the trained encoder function, the one or more seed domain names in a low-dimensional information-rich latent space; modifying a representation of one domain name of the one or more seed domain names that is encoded in the low-dimensional information-rich latent space; and generating, using the hardware processor implementing the trained decoder function, one or more unregistered domain names for domain name registration from the representation that is modified.

20 Claims, 16 Drawing Sheets

1000

StopSmoking.com -> [ 2.0651e-04,   -0.6957e-03, ... , -2.5637e-04, 2.1002e-04]
[ 2.0651e-04, -2.3263e-03, ..., -2.5637e-04, 2.1002e-04] -> Stoom.com
[ 2.0651e-04, -1.1805e-03, ..., -2.5637e-04, 2.1002e-04] -> Stopsmoke.com
[ 2.0651e-04, -0.7461e-03, ..., -2.5637e-04, 2.1002e-04] -> Stopsmoking.com
[ 2.0651e-04, -0.4215e-03, ..., -2.5637e-04, 2.1002e-04] -> Stopsmokings.com
[ 2.0651e-04, -0.1368e-03, ..., -2.5637e-04, 2.1002e-04] -> Stopsmokingad.com
[ 2.0651e-04, 0.4215e-03, ..., -2.5637e-04, 2.1002e-04] -> Stopsmokingapp.com
[ 2.0651e-04, 0.7461e-03, ..., -2.5637e-04, 2.1002e-04] -> Stopsmokingalert.com
[ 2.0651e-04, 1.1802e-03, ..., -2.5637e-04, 2.1002e-04] -> Stopsmokingadjusting.com

FIG. 10

| | | | | | |
|---|---|---|---|---|---|
| onprot | onproture | onprotruck | onlypratthe | onlyprotrafin | onlyprotraffics | onlyprotrafficing | onlineproprnational |
| onprog | onprogue | organprofit | organicprof | organicprofile | organicprofits | organicprofiles | organicprofessional |
| ourpe | orgpurse | organprofit | organicplus | organicplease | organicpleasure | organicperformance | organicperformrack |
| orgle | orgpussy | organfrog | organicflag | organicflags | organicperform | organicperformer | organicfarmparked |
| orgo | orgglaze | organflat | organicflag | organicflame | organicflamingo | organicfallsfan | organicfarmoffices |
| orgot | orgglue | organfact | organicforum | organicfalcon | organicfalcons | organicfalconware | organicfalconwalk |
| orgot | orgglove | organfact | organicforce | organicforum | organicforces | organicforecasts | organicforeclosures |
| orgov | orgggods | organform | organicfood | organicformat | organicformation | organicfoodrating | organicfoodcreation |
| orgon | orggone | organfood | organicfood | organicfoods | organicfoodstore | organicfoodstate | organicfoodsteaks |
| amfon | orgonzone | orgonemove | organicfood | organicfoodnow | organicfoodnow | organicfoodnotes | organicfoodnovels |

FIG. 15

METHOD FOR GENERATING A DOMAIN NAME USING A LEARNED INFORMATION-RICH LATENT SPACE

FIELD

This disclosure relates generally to internet domain names, and more particularly, to generating new domain names using a learned information-rich latent space to represent domain names.

BACKGROUND

The domain name system ("DNS") is a hierarchical distributed naming system for resources provided by computer servers that are connected to the internet. The DNS associates domain names to numeric internet protocol ("IP") addresses of internet resources, including resources managed by web hosting providers, which provide the web server computers that serve the web pages associated with domain names. The DNS thus allows computers and humans to access networked resources, including web pages, using names.

A DNS "registry" is an authoritative, master database of all domain names registered in a top-level domain or other domain in which domain names can be registered. A registry includes many hardware computer servers operably coupled to the internet. A registry keeps the master database and also generates a "zone file" that includes DNS resource records for the top-level domain, which allows computers to look up DNS records in the top-level domain from anywhere in the world. Internet users generally interact with the registry via intermediaries. For ease of discussion, a registry is identified with its hardware computer servers unless otherwise specified or clear from context.

SUMMARY

According to an embodiment, a computer-implemented method of generating unregistered internet domain names using a variational autoencoder is provided. The variational autoencoder may comprise a trained encoder neural network and a trained decoder neural network. The method can comprise obtaining one or more seed domain names; mapping, using a hardware processor implementing the trained encoder neural network, the one or more seed domain names in a low-dimensional information-rich latent space; modifying a representation of one domain name of the one or more seed domain names that is encoded in the low-dimensional information-rich latent space; and generating, using the hardware processor implementing the trained decoder neural network, one or more new domain names for domain name registration from the representation that is modified.

According to an embodiment, a non-transitory computer-readable medium comprising instructions that when executed by a hardware processor cause the hardware processor to perform a method is provided. The method includes generating unregistered internet domain names using a variational autoencoder comprising a trained encoder neural network and a trained decoder neural network, the method comprising: obtaining one or more seed domain names; mapping, using the trained encoder neural network, the one or more seed domain names in a low-dimensional information-rich latent space; modifying a representation of one domain name of the one or more seed domain names that is encoded in the low-dimensional information-rich latent space; and generating, using the trained decoder neural network, one or more new domain names for domain name registration from the representation that is modified.

According to an embodiment, a computer system is provided that comprises a hardware processor; a non-transitory computer readable medium storing instructions that when executed by the hardware processor perform a method of generating unregistered internet domain names using a variational autoencoder comprising a trained encoder neural network and a trained decoder neural network. The method comprises obtaining one or more seed domain names; mapping, using the hardware processor implementing the trained encoder neural network, the one or more seed domain names in a low-dimensional information-rich latent space; modifying a representation of one domain name of the one or more seed domain names that is encoded in the low-dimensional information-rich latent space; and generating, using the hardware processor implementing the trained decoder neural network, one or more new domain names for domain name registration from the representation that is modified.

In some embodiments, the variational autoencoder is trained offline using a plurality of domain names extracted from a domain name system (DNS) zone file.

In some embodiments, the trained encoder function comprises a deep convolutional neural network or a recurrent neural network using character level information from the one or more seed domain names.

In some embodiments, the trained decoder function comprises a deep recurrent neural network, wherein the one or more new domain names are generated at a character level from a latent vector.

In some embodiments, the one or more seed domain names are mapped as vector representations in the low-dimensional information-rich latent space.

In some embodiments, the modifying further comprises adding a Gaussian noise to the vector representations of the one or more seed domain names in the low-dimensional information-rich latent space.

In some embodiments, the method further comprises varying a dimension of the vector representations of the one or more seed domain names in the low-dimensional information-rich latent space, wherein the dimension that is varied encodes a feature comprising a length of a seed domain name from the one or more seed domain names, a topic of the seed domain name, a syntactic characteristic of the seed domain name, or combinations thereof.

In some embodiments, the method further comprises applying one or more vector operations to the vector representations in the low-dimensional information-rich latent space.

In some embodiments, the method further comprises interpolating between a first vector representation of a first seed domain name and a second vector representation of a second seed domain name in the low-dimensional information-rich latent space.

In some embodiments, the method further comprises determining a centroid of a set of two or more seed domain names in the low-dimensional information-rich latent space and applying Gaussian noise to a vector representation of the centroid.

In some embodiments, the generating further comprises decoding vector representations that were generated in the low-dimensional information-rich latent space to yield the one or more new domain names.

In some embodiments, the one or more new domain names are syntactically and/or semantically similar to one of the one or more seed domain names.

In some embodiments, the obtaining the one or more seed domain names comprises: providing a web page for registering domain names; accepting the one or more seed domain names as an input from a web page visitor; and displaying the one or more new domain names for one of the one or more seed domain names in response to the web page.

According to an embodiment, the domain name generation method may include two distinct phases. The first phase may be a training phase to train the neural network. In the training phase, an encoder function may be trained to map a domain name to its vector representation in a continuous latent space, and a decoder function may be trained to map any point or vector from the continuous latent space to a new domain name. The encoder function and decoder function can be trained from a large dataset of domain names, such as the com/net zone. The encoder function can include a recurrent neural network, which can include one or more Gated Recurrent Unit layers, or a convolutional neural network, which can use temporal convolutions with ReLU activations and batch normalization over a one-hot encoding of the domain name. According to an embodiment, the variational autoencoder does not directly output the internal representation z of the input domain x in the latent space but parameters µ and σ of a Gaussian distribution $\mathcal{N}(\mu, \sigma)$ used as posterior distribution q(z|x) for latent vectors z. Parameters p and a are vectors with the same dimensions as z. The decoder function can include a neural network (p(x|z)), such as a recurrent neural network comprising stacked GRU layers, with teacher forcing, which can sample domain names at a character level. The encoder function and decoder function can be trained using Adaptive Moment Estimation, for example, to maximize the reconstruction log-likelihood $\mathbb{E}_{q(z|x)}[\log p(x|z)]$ as well as to minimize the Kullback-Leibler (KL) divergence between the posterior q(z|x) and its prior p(z) which has a normal distribution $\mathcal{N}(0,1)$. The KL term ensures that the learned latent space is dense and feature-rich while the reconstruction error allows the model to reconstruct valid domain names. The noisy z encoding learns a structure of a continuous latent space. If the encoder function were deterministic, each domain would be encoded to a single point in space. The noisy encoder function, during the training, forces the neural network to learn a continuous space by mapping a domain to a noisy area rather than a point. In a non-limiting example, the training is performed off-line, once, using 10 million domain names from the list of registered .com and .net domain names. According to an embodiment, the continuous latent space with 10 to 100 dimensions, which correspond to the dimensions of the multivariate Gaussian distribution, can be used.

According to an embodiment, a reparametrization trick may be applied to make the network differentiable. The latent vector z is sampled from a normal distribution $\mathcal{N}(\mu, \sigma)$, with µ, σ the output of the encoder network. The non-deterministic operation may be not differentiable (For example, the autoencoder needs to be differentiable to train it using gradient descent). The reparametrization trick can include approximating z in the following way; $z=\mu+\sigma\theta$, with $\theta \sim \mathcal{N}(0,1)$ which is differentiable.

The second phase may be a generation phase. In the generation phase, the learned encoder/decoder may be used to generate new domain names. According to an embodiment, the latent space is continuous, containing an infinity of points which can be mapped to new domain names that are potentially not registered and are created character by character by the decoder. The output space may be limited by the discrete nature of the domain names.

In a first method, the encoder may obtain the latent representation z of the input domain name. Gaussian noise may then be added to the sampled latent vector. The resulting latent vector may be decoded to generate a domain name for suggestion. This process can repeated with a different noise vector to generate more domain names for suggestion. According to an embodiment, as more Gaussian noise is added, the more different the generated domain name will be from the input.

According to an embodiment, in a second method, after the variational autoencoder has been trained, the latent dimensions may be analyzed to identify to which feature of the domain name they correspond (e.g., length, topic, sentiment, interesting syntactic features). This can be done by varying a single dimension at a time in the latent vector of a seed domain name, and observing the decoded result. This may allow for the application of controlled modifications to the input domain name. Similar to the first method, a domain name may be encoded to a latent representation z. The selected relevant dimensions can be varied and the resulting vector may be decoded to obtain a new domain with the desired features.

According to an embodiment, in a third method, since the latent representation is a continuous vector space, vector operations can be applied on the encoding of domain names, which can then be decoded to new domain names. This method also allows a fine-grained control over the generated domains. By subtracting the latent representation of the acronym version of a domain name from the original domain name representation and optionally averaging the resulting domain for several similar embodiment, the vector corresponding to the acronymize operation can be obtained and applied to any new encoded domain name.

According to an embodiment, in a fourth method, since the latent representation is a continuous vector space, the space between two domains encoding can be interpolated in the latent space and the interpolated vectors decoded to new domains which exhibits features similar to the two input domains.

Disclosed embodiments provide many technical advantages over the prior art, including over word-based and character-based language model techniques. Various embodiments disclosed herein generate domain names at a character level and not bounded by a word dictionary. Moreover, the present application can provide for a more fine-grained control over the generated domain names (e.g. ability to generate a domain similar to one or several other domains, to control what kind of features are varied (e.g., syntax, length, semantics), to control how much a domain should be varied, the ability to blend multiple domains together, etc.). Further, the present application can provide a more focused domain name generation technique based on an individual's needs and interests than those that are selected or generated by other techniques. Some embodiments have the ability to capture deep contextual relationships at the character-level. These and other advantages are disclosed herein. Various technical improvements include, but are not limited to, making use of a learned information-rich latent space, learn by a variational autoencoder, that provides ways to generate more targeted domain name suggestions, one of which the user is likely to select early in the process. This technique is a technological improvement over prior art domain name generators in that it creates and suggests domain names that are targeted and customized and more relevant for the particular user, which allows a user to find and register a satisfactory domain name more quickly, which reduces bandwidth usage, processor usage, storage, and wasted user time.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 10 shows results using the method 900, where it was identified offline that dimension 2 controls the length of the domain;

FIG. 15 shows a low dimensional latent space representation, according to embodiments of the present disclosure.

DESCRIPTION OF THE EMBODIMENTS

Reference will now be made in detail to embodiment implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments include techniques for generating and presenting to a user (e.g., a potential registrant) one or more suggested domain names that are available for registration. The suggested domain names may be similar to a seed domain name in which the user previously expressed interest, e.g., by requesting to register it. The suggested domain names may be obtained by using one or more models trained by mapping input domain names to a feature-rich latent space. Some modifications are applied to these domains using various operations in this dense low-dimensional space (see other sections), and the resulting vectors are mapped back to domain names. The encoder function is used to map domain names to the continuous latent space and the decoder function is used to map latent vectors to domain names. By using the variational autoencoder, the system may learn a representation (e.g., an encoding) for a set of data, (e.g., DNS zone data), for the purpose of dimensional reduction and to reconstruct the input at the output. This structure may be trained on, for example, millions of existing domain names, with constraints ensuring that the learned latent space is dense and feature-rich (KL loss term), and that the decoder is able to reconstruct domain names previously encoded by the encoder (reconstruction term). During training, a set of domain names from a DNS zone can be used as input. Each of the domain names in the set of domain names are encoded by the encoder function into a vector representation in a low dimensional vector space (e.g., a latent space). In various embodiments, a low dimensional vector space may be a vector space having less than, for example, 10 dimensions, and various embodiments have less than, for example, 4 dimensions. The vector representation may then be decoded by the decoder function and produced as an output. The models can be used generatively to create new domain names that are similar in syntax and/or semantics to a user-requested domain name. The generated names can be filtered to remove any already-registered domain names, and the novel, filtered results output to a user for inspection and registration, or other uses.

Figure 1:
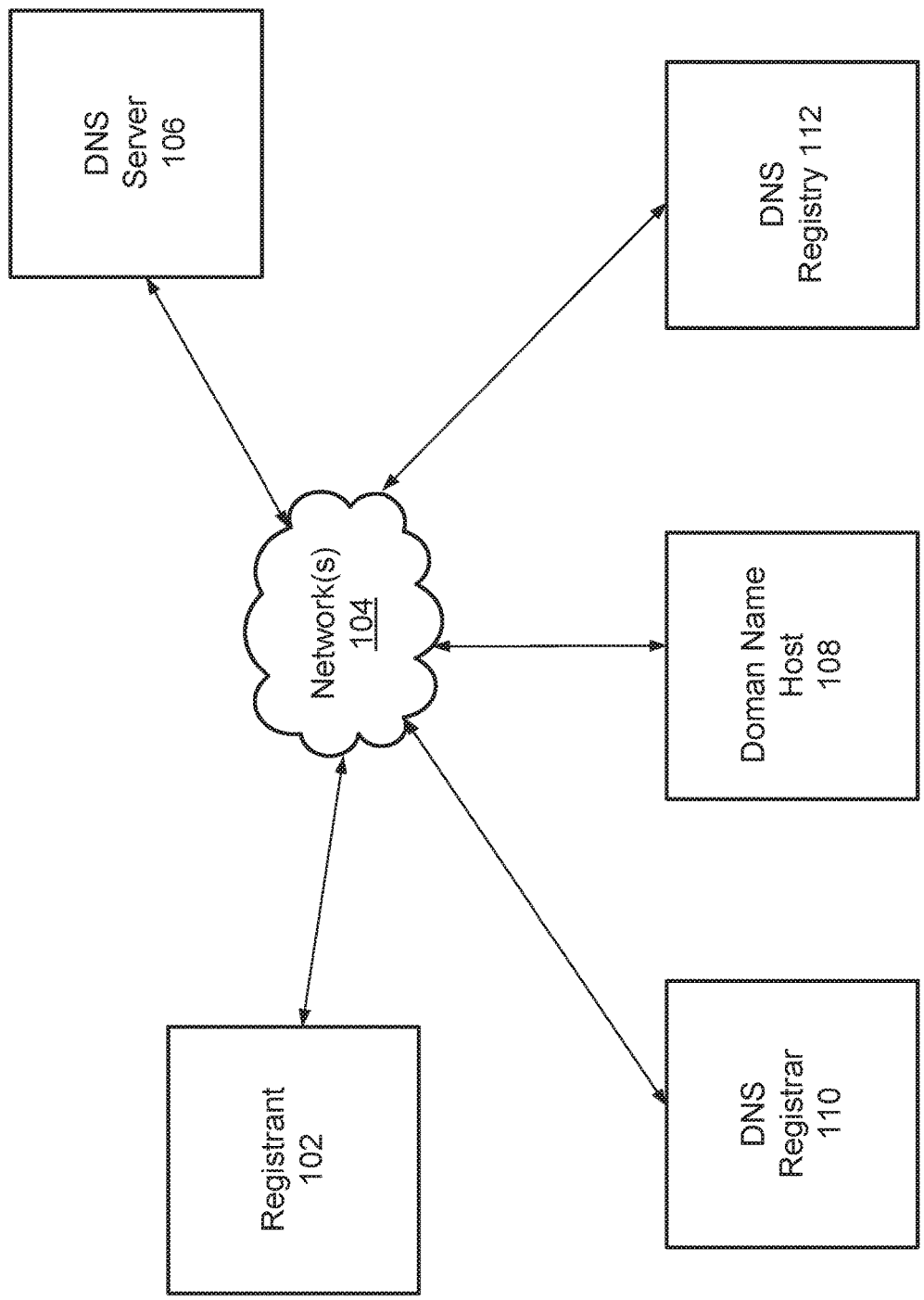
FIG. 1 shows a schematic diagram illustrating a portion of the domain name system ("DNS"), according to embodiments of the present disclosure.

FIG. 1 is a schematic diagram illustrating a portion of the domain name system ("DNS") according to some embodiments. As depicted in FIG. 1, a domain name (e.g., www.example.com) can be registered to an internet user known as a registrant 102 by a registrar 110. In general, registrars compete with one another to register domain names for registrants. An internet user interacts with a registrar 110 through the internet 104 to register a domain name, thereby becoming a registrant 102 for that name. The registrar 110 asks the registrant 102 to provide various contact and technical information for the registration. The registrar 110 then keeps a record of the contact information and submits the technical information to a DNS registry 112. The registrar 110 also typically receives a fee for its services from the registrant 102.

When any internet user attempts to navigate his or her browser to the registered domain through internet 104, the browser contacts a DNS server 106, which provides an IP address for the domain name host 108 of the registered domain by looking up an appropriate DNS resource record for the domain name. The internet user's browser then navigates to the domain name host 108 using its IP address to retrieve the resource of the domain name, e.g., content.

For ease of discussion, a registrar is identified with its hardware computer servers unless otherwise specified or clear from context. Further, an internet user has a hardware client computer. For ease of discussion, a user is identified with the user's computer, and a registrant (e.g., registrant 102) is identified with his or her hardware client computer unless otherwise specified or clear from context.

Figure 2:
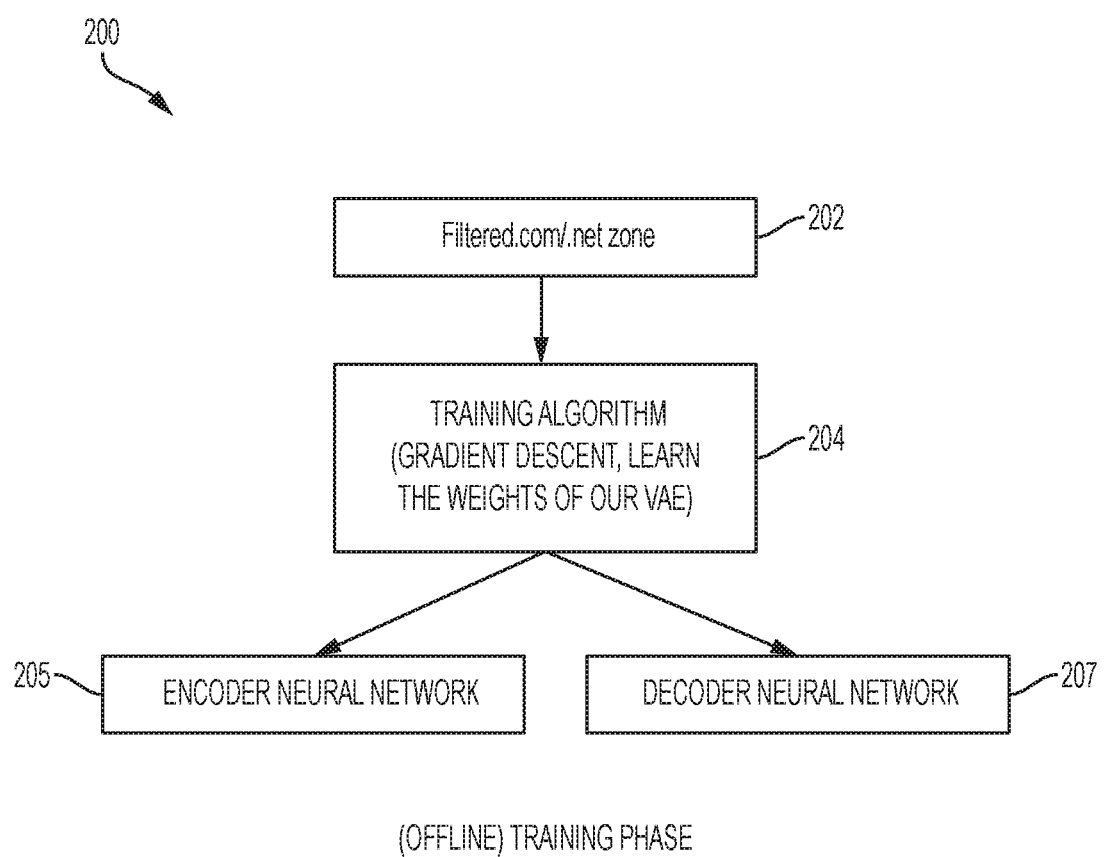
FIG. 2 shows a flow diagram of a method for generating domain names, according to embodiments of the present disclosure.

FIG. 2 is a flow diagram of a method 200 for training an encoder function and a decoder function that is performed in an offline training phase, according to some embodiments. The method 200 of FIG. 2 may be implemented by the system 1600 shown and described below in reference to FIG. 16.

At block 202, method 200 obtains a plurality of domain names, e.g. registered domain names that are currently in use. The plurality of domain names will serve as a training corpus for a machine learning algorithm, as disclosed below in reference to block 204. The sets of domain names may be obtained as follows, by way of a non-limiting embodiment. Initially, method 200 may obtain an entire DNS zone file, or even a plurality of DNS zone files. The domain names from the one or more zone files may then be extracted, filtered, and categorized. In some embodiments, the domain names can be internationalized domain names (IDN) where the Unicode version of these domains can be used in a training set. In some embodiments as part of this block, the domain names from which no features of our interest can be learned, such as names containing sensitive content, may be filtered out (i.e., removed from the train corpus).

In a non-limiting embodiment, the training involved uses 10 million random domains from the COM/NET zone. For convenience and faster convergence, domain names can be selected that are shorter than, for example, 35 characters; however, the methods described herein work on any length of domain name. The method allows for fine grained control of the generated domains, while being trained in an unsupervised way. The domain names used for training do not have to be annotated nor classified for the model to learn feature-rich dimensions in the latent space. The model can be specialized for a single language by selecting domain names from a specific location only.

In some embodiments, after being obtained, the domain names may be formatted for use by the algorithms described herein. Such formatting may include stripping out top-level domains, for example, changing "example.com" to "example" by removing the ".com" top-level domain. The formatting may further include representing the domain names as vectors. The domain names may be represented as vectors and representing individual characters of the domain name as "one-hot" vectors of a length equal to the size of the character set or alphabet (inclusive any special stop character symbol, as described presently), where each character in a domain name is mapped to a vector which has the size of the English vocabulary (26 letters+dash+null character (padding)+start token+end token=30). A specific vector signifying the end of the domain name may be appended at the end of the input representation. One or several padding vectors may be appended at the end of the representation to ensure that any input has the same dimension.

At block 204, method 200 trains a variational autoencoder, using the training set of domain names obtained at block 202, to generate a corresponding digitally represented and stored model. The variational autoencoder may be trained using a gradient descent algorithm, which is iteratively fed mini-batches of a few hundreds domains, for example, from the training set to learn the weights of the variational autoencoder, and which produces a trained encoder function 205 (or trained encoder, learned encoder, or encoder) and a trained decoder function 207 (or trained decoder, learned decoder, or decoder). The result of the actions or operations of block 204 is that method 200 electronically stores in persistent memory (e.g., persistent memory 1612 of FIG. 16) a plurality of sets of domain names.

Figure 3:
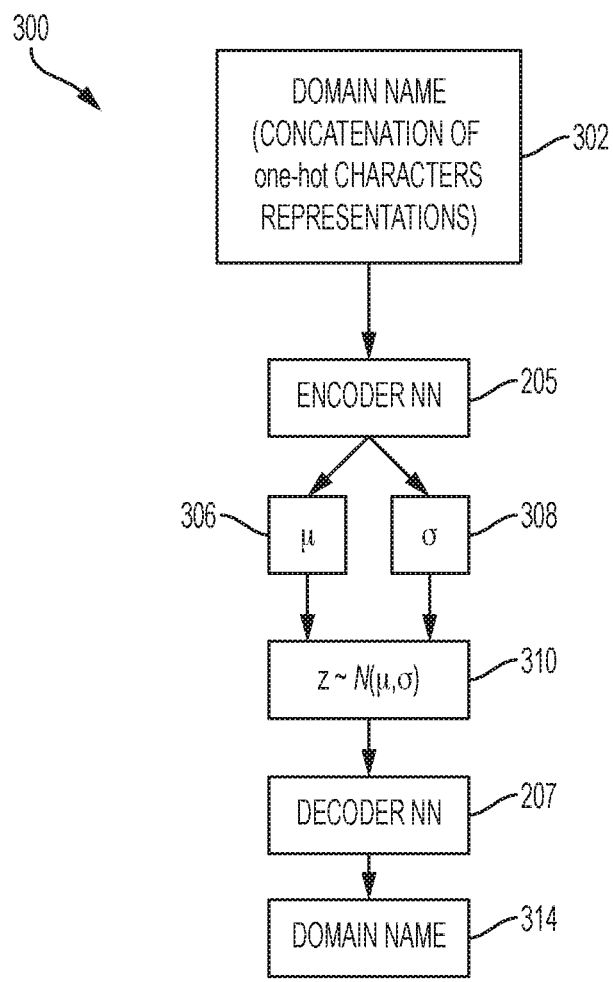
FIG. 3 shows an architecture of a variational autoencoder 300, according to embodiments of the present disclosure.

FIG. 3 shows a method 300 for generating domain names using a variational autoencoder configured with the trained encoder function and the trained decoder function, in accordance with embodiments. The method 300 may be implemented by the system 1600 shown and described below in reference to FIG. 16. Method 300 may be used to generate one or more unregistered domain names, starting from a registered or unregistered domain name, which may be referred to as a starting domain name or a seed domain name. The generated domain names may be produced according to the below discussed methods using operations on the latent space so as to be similar to a syntax and/or sematic from of the starting domain name. The generated domain names may have a similar form and/or be contextually similar to the starting domain name.

As discussed above, in the training phase, the trained encoder function 205 may encode a domain name to a continuous latent space and the decoder function 207 may decodes vector in the continuous latent space back to a domain name. At 302, the method 300 begins by obtaining a seed domain as a concatenation of one-hot characters representations. The seed domain is then provided to the trained encoder function 205, which can include a recurrent neural network (several Gated Recurrent Unit layers) or a convolutional neural network (using temporal convolutions (with a rectified linear unit (ReLU) activations and batch normalization) over a one-hot encoding of the domain name. According to an embodiment, in the variational autoencoder, the trained encoder function 205 does not directly output the internal representation z (latent space) of the input domain x in the latent space but parameters $\mu$ 306 and $\sigma$ 308 of a Gaussian distribution $\mathcal{N}(\mu, \sigma)$ 310, used as posterior distribution q(z|x) for latent vectors z. The trained decoder function 207 (p(x|z)) may include a recurrent neural network (stacked GRU layers), with teacher forcing, which can sample domain names at a character level. The variational autoencoder may be trained using Adaptive Moment Estimation, for example, to maximize the reconstruction log-likelihood $\mathbb{E}_{q(z|x)}[\log p(x|z)]$ as well as to minimize the Kullback-Leibler (KL) divergence between the posterior q(z|x) and its prior p(z) which has a normal distribution $\mathcal{N}(0,1)$. The KL term ensures that the learned latent space is dense and feature-rich while the reconstruction error allows our model to generate valid domain names. The noisy z encoding encourages to learn a continuous latent space. In a non-limiting embodiment, the training is performed offline, once, using 10M domains from the com/net zone. In an embodiment, a latent space with 10 to 100 dimensions can be used. The trained decoder function 207 then outputs a domain name 314.

Figure 4:
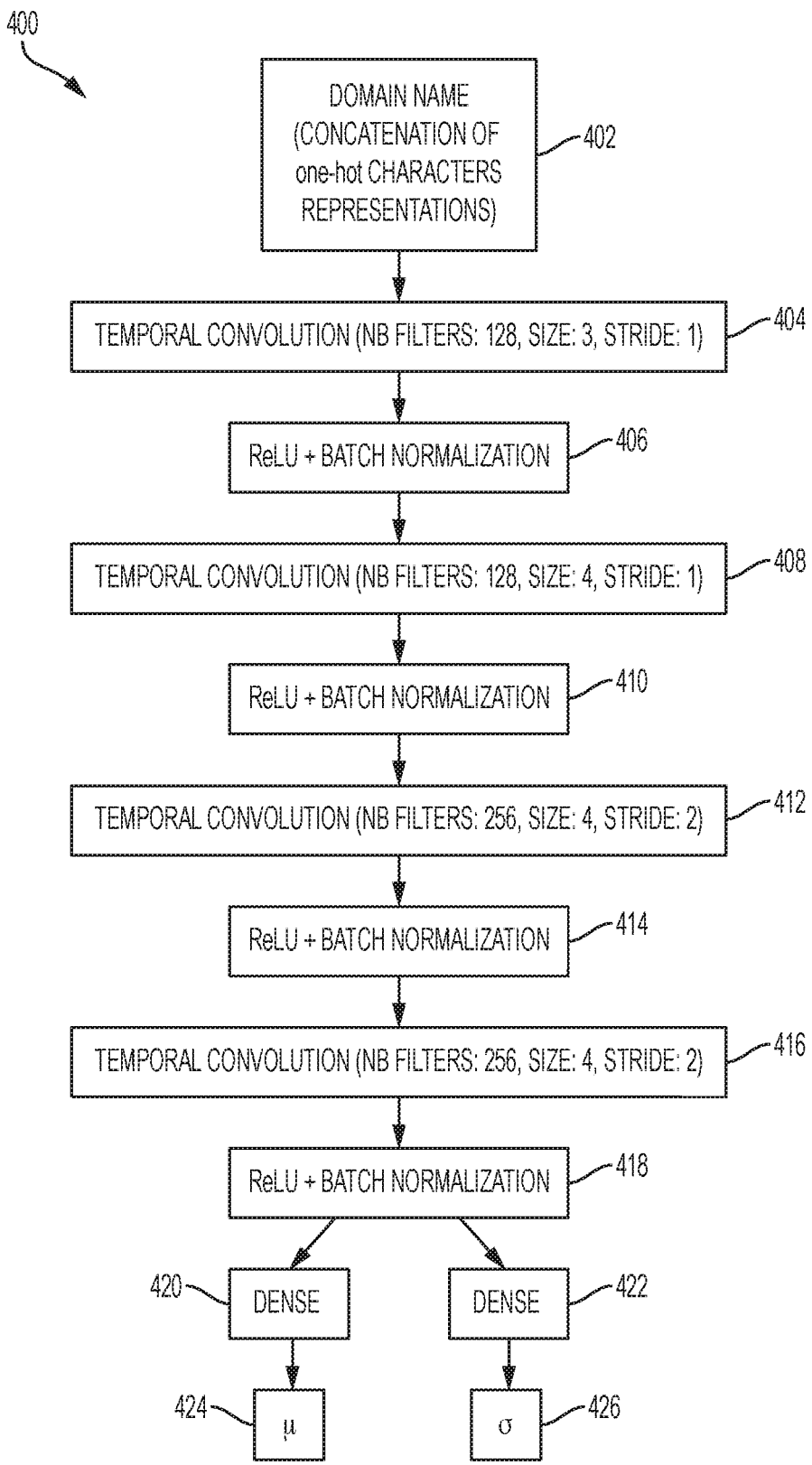
FIG. 4 shows a convolutional encoder network 400, according to embodiments of the present disclosure.

FIG. 4 shows an architecture for the encoder function 400, according to embodiments of the present disclosure. The encoder function 400 can be used as the trained encoder function 205. The input 402 consists of a matrix of dimension [V, L] where V is the size of the alphabet and L is the maximum length of a domain name. Multiple temporal convolution layers are successively applied with various number of filters, kernel sides and stride determined experimentally. Each convolutional layer 404, 408, 412, 416 is separated by an activation function (a rectified linear unit)

and batch normalization layer 406, 410, 414, 418. Two parallel fully connected layers output respectively, via fully connected layers (dense layers) 420 and 422, the mean μ 424 and the standard deviation α 426 of the posterior normal distribution q(z|x). Alternatively, a recurrent architecture can be used for the encoder comprising several Gated Recurrent Units (GRU) layers followed by two parallel fully connected layers to output the parameters of the normal distribution.

Figure 5:
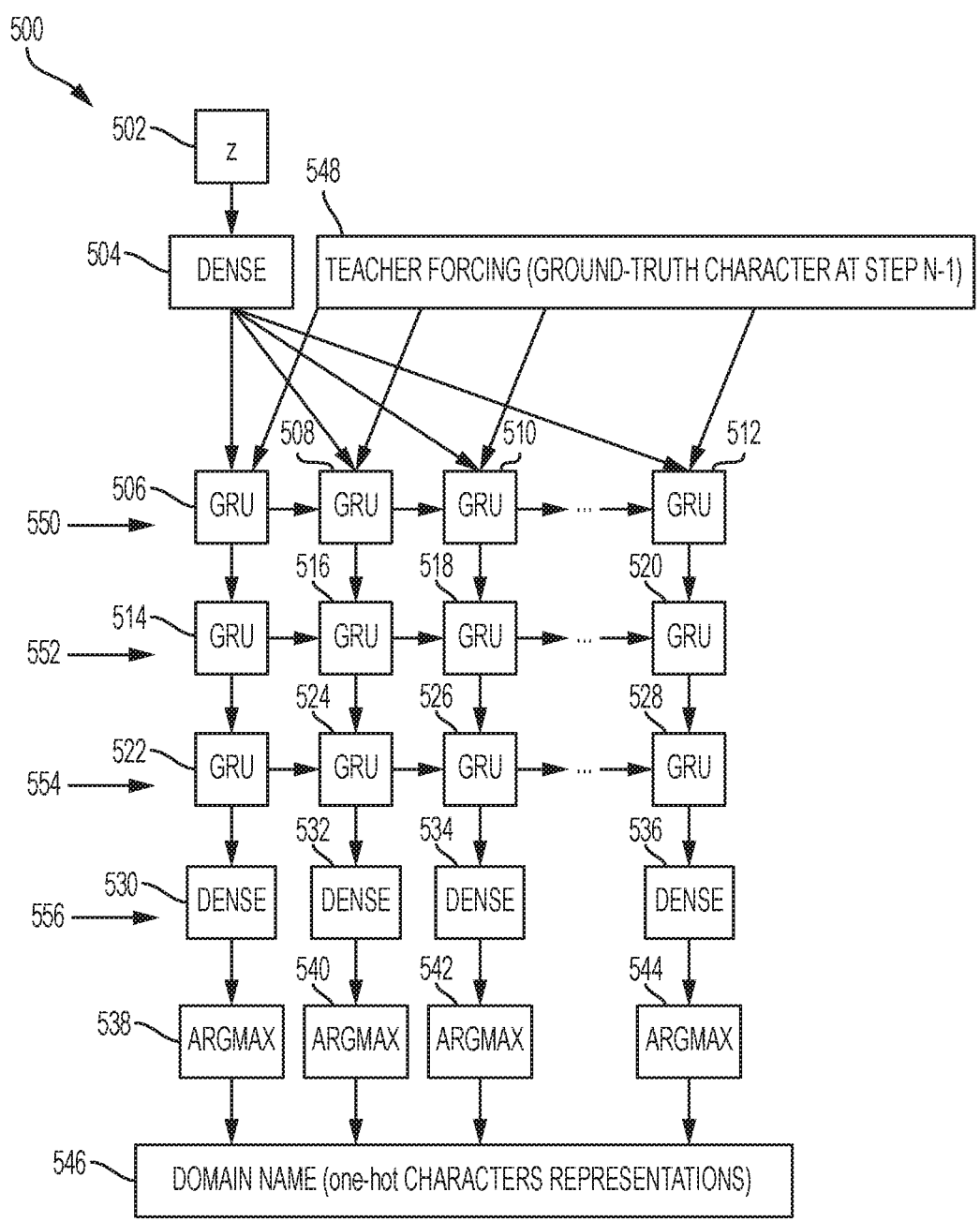
FIG. 5 shows a recurrent decoder network 500, according to embodiments of the present disclosure.

Because of the nature of the output (e.g. domain names), a recurrent architecture may be chosen for the decoder. FIG. 5 illustrates an architecture for the decoder function 500, according to embodiments of the present disclosure. The decoder function 500 can be used as the decoder 312. The input 502 of the decoder is a latent vector z. The input 502 may be passed into a fully connected layer (dense layer) 504 followed by multiple Gated Recurrent Units (GRU) layers, including a first GRU layer 550, represented at different time steps by nodes 506, 508, 510, 512, a second GRU layer 552, represented at different time steps by nodes 514, 516, 518, 520, and a third GRU layer 554, represented at different time steps by nodes 522, 524, 526, 528. At each time step, a dense layer 556, represented by nodes 530, 532, 534, and 536, may be applied to the outputs of the GRUs, and the argument of the maxima in the resulting vectors 538, 540, 542, and 544 are retained to be the indices of the sampled characters in the domain name 546, since there is one vector per time step generated, where each vector corresponds to one character of the domain name. In order to improve the stability of the model and enable faster convergence, a teacher-forcing technique 548 may be applied by concatenating the ground-truth character for the previous time step to the latent vector at the input of the first GRU layer. At generation time, the last predicted character is concatenated to the latent vector. The decoder function 500 can be seen as a character-based recurrent neural network (RNN) language model conditioned on the latent vector.

In some implementations, during training, the input domain name can be analyzed by the encoder 205 where the variational autoencoder learns "feature-rich" representation of domain names, as opposed to a traditional autoencoder in which these dimensions would not convey any useful information because it does not have any constraint on the structure of the latent space. The inferred latent variables are learned in an unsupervised way by the variational autoencoder, which can convey useful information such as length, topic, presence of dashes, sentiment, etc. These inferred latent variables can then be used to generate new domain names.

There are various ways in which the seed domain name may be obtained. According to some embodiments, the seed domain name is obtained when a user supplies it; for example by interacting with a domain name registration website, such as the domain name registrar 110 of FIG. 1. Such a user may attempt to search for or register a specific domain name, and after discovering that the domain name is already registered by another, may conduct a conventional search for a different domain name to register. In a conventional search, the website may search for a domain name based on the user's input(s), including, but not limited to, one or more user-supplied search terms. Once the conventional domain suggestion process accepts the user's input(s) and identifies one or more domain names responsive to the user's search parameters, the conventional process may identify which of the resulting domain names are already registered and may be supply one or more of those domain names as the seed domain name(s).

Thus, one of the domain names from the results of the user's conventional search, or the first domain name that the user attempted to register, if already registered, may be selected or used as the seed domain name. As noted above, according to some embodiments, the seed domain name may be obtained from a conventional domain name suggestion process, e.g., at a domain name registration website such as domain name registrar 110 of FIG. 1. Other techniques for obtaining a seed domain name are also possible and not limited to the specifically-disclosed embodiments presented herein. After a seed domain name is obtained at block 206, control passes to block 208.

Figure 6:
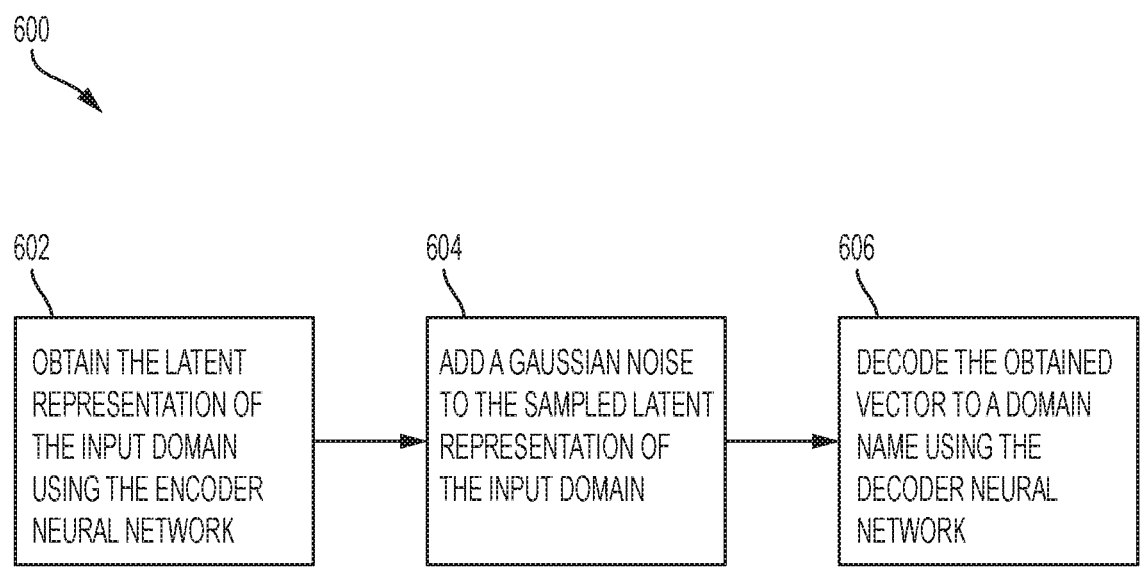
FIG. 6 shows a first method 600 for generating a domain name, according to embodiments of the present disclosure.

FIG. 6 shows a first method 600 for generating a domain name, according to embodiments of the present disclosure. In the generation phase, the learned encoder/decoder are used to generate new domain names. The latent space is continuous, meaning the latent space contains an infinity of points which can be mapped to new domain names that are potentially not registered and are created character by character by the decoder.

In a first method 600, the encoder may obtain, at 602, the latent representation z of the input domain name. Gaussian noise may then added, at 604, to the sampled latent vector. The resulting latent vector may be decoded, at 606, to obtain a domain name suggestion. This process may be repeated with a different noise vector to obtain more domain name suggestions. According to an embodiment, as more Gaussian noise is added, the more different the generated domain will be from the input.

Figure 7:
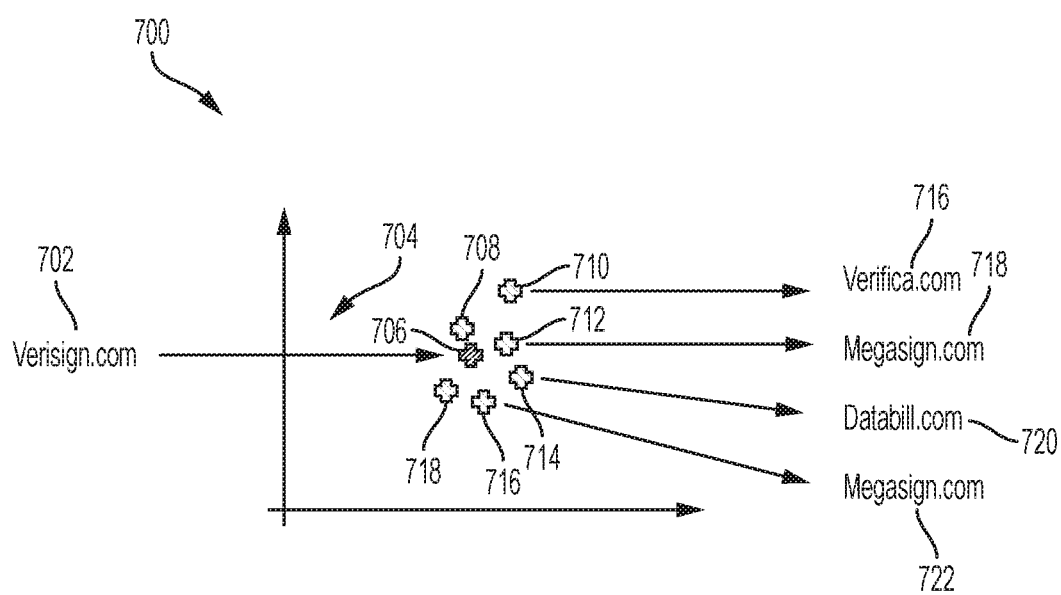
FIG. 7 shows a low dimensional latent space representation 700 for another seed domain name, according to embodiments of the present disclosure.

FIG. 7 shows a low dimensional latent space representation 700 for a seed domain name, according to embodiments of the present disclosure. In the embodiment shown, the seed domain name "Verisign.com" 702 is encoded in the low dimensional latent space by the trained encoder function 205, which is represented in FIG. 7 as a two-dimensional vector space 704. The seed domain name "Verisign.com" 702 can be represented in the two-dimensional vector space 704 as vector at point 706. Points 708, 710, 712, 714, 716, and 718 can be sampled by adding more or less Gaussian noise to the vector 706. After the new vectors are chosen, they can be decoded into their corresponding domain names using the trained decoder function 207, which are syntactically and/or semantically similar to the seed domain name "Verisign.com" 702 because their vector representations are within a predefined distance of vector at point 706. For example, the trained decoder function 507 can decode the vector at point 710 to produce an output domain name "Verifica.com" 716, decode the vector at point 712 to produce an output domain name "Megasign.com" 718, decode the vector at point 714 to produce an output domain name "Databill.com" 720, and decode the vector at point 716 to produce an output domain name "Megasign.com" 722.

Figure 8:
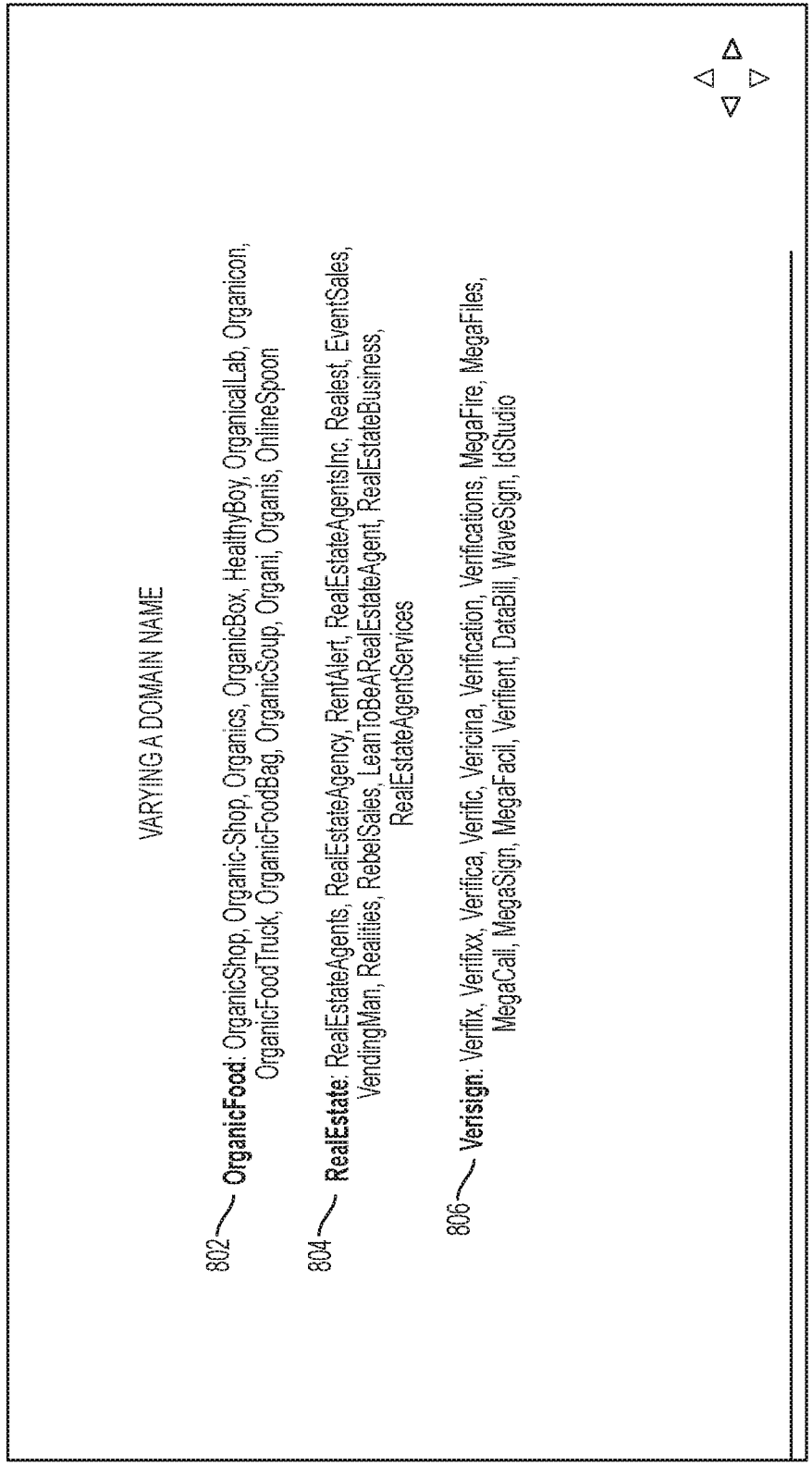
FIG. 8 shows three embodiments for varying a seed domain name, according to the technique of FIG. 6 and other embodiments of the present disclosure.

The method of FIG. 6 may be applied to generate new domain names that are syntactically and/or semantically similar to the seed domain name. FIG. 8 shows three examples for varying a seed domain name 800, according to the technique of FIG. 6 and other embodiments of the present disclosure. For a seed domain name "OrganicFood" 802, the model can produce the following similar domain names: OrganicShop, Organic-Shop, Organics, OrganicBox, HealthyBoy, OrganicalLab, Organicon, OrganicFoodTruck OrganicFoodBag, OrganicSoup, Organi, Organis, and OnlineSpoon. For the seed domain name "RealEstate" 804, the model can produce the following similar domain names: RealEstateAgents, RealEstateAgency, RentAlert, RealEstateAgentsInc, Realest, EventSales, VendingMan, Realities, RebelSales, LearnToBeARealEstateAgent, RealEstateBusiness, and RealEstateAgentServices. For the seed domain name "Verisign" 806, the model can produce the following similar domain names: Verifix, Verifixx, Verifica, Verific, Vericina, Verification, Verifications, MegaFire, MegaFiles, MegaCall, MegaSign, MegaFacil, Verifient, DataBill, WaveSign, and IdStudio. As noted with respect to FIG. 7, the system may produce these outputs or results because they are nearby in vector space from the vector representing the input seed name.

Figure 9:
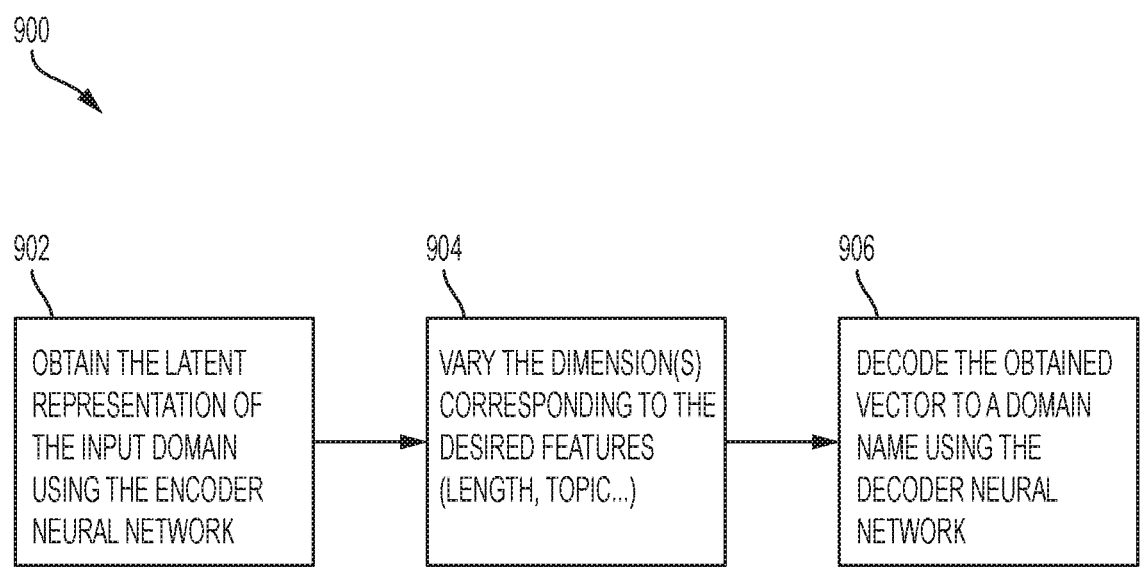
FIG. 9 shows a second method 900 for generating a domain name, according to embodiments of the present disclosure.

FIG. 9 shows a second method 900 for generating a domain name, according to embodiments of the present disclosure. In the generation phase, the learned encoder/decoder may be used to generate new domain names. The latent space may be continuous, for example, such that the latent space contains an infinity of points which can be mapped to new domain names that do not exist and are created character by character by the decoder.

Similar to the techniques of the first method 600, the method 900 may encode a domain name to a latent representation z. The method 900 may begin by obtaining, at 902, the latent representation of the input domain using the encoder function. The method 900 may continue by varying, at 904, the dimension(s) corresponding to the desired features (length, topic, etc). The method 900 may continue by decoding, at 906, the obtained vector using the decoder function to obtain a new domain name with the desired features.

FIG. 10 shows exemplary results using the method 900, where it was identified offline that dimension 2 controls the length of the domain. For the example input domain name "StopSmoking.com," which is encoded in the latent space as the vector (2.0651e-04, −0.6957e-03, . . . , −2.5637e-04, 2.1002e-04). The following new domain names are generated: Stoom.com, Stopsmoke.com, Stopsmoking.com, Stopsmokings.com, Stopsmokingad.com, Stopsmokingapp.com, Stopsmokingalert.com, and Stopsmokingadjusting.com.

Figure 11:
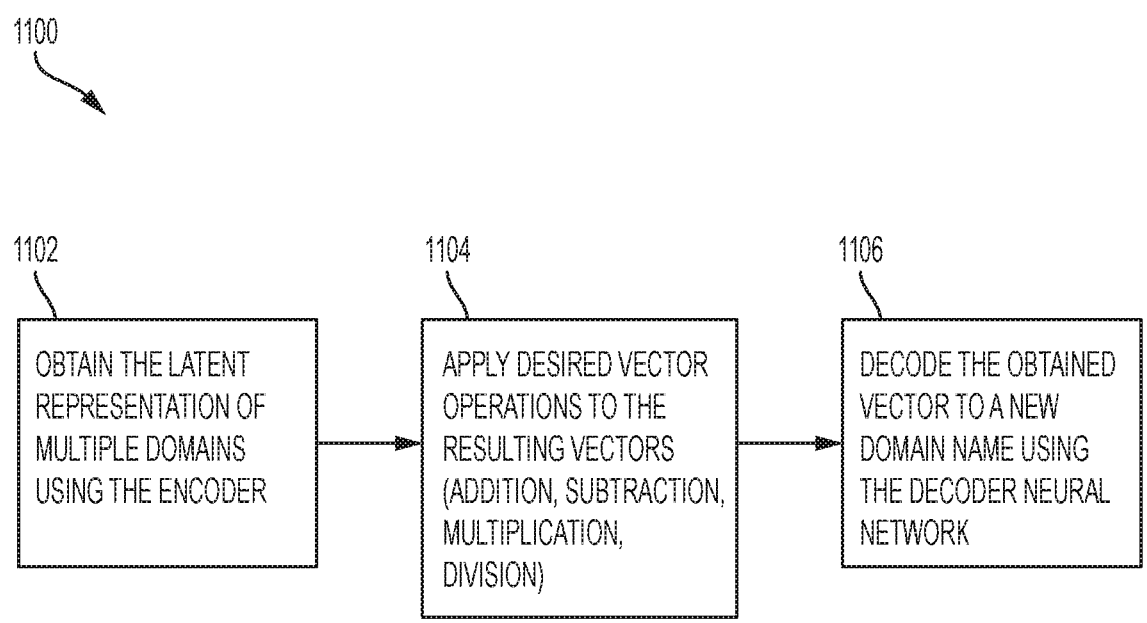
FIG. 11 shows a third method 1100 for generating a domain name, according to embodiments of the present disclosure.

FIG. 11 shows a third method 1100 for generating a domain name, according to embodiments of the present disclosure. In the generation phase, the learned encoder/decoder may be used to generate new domain names. The latent space may be continuous. In a continuous latent space, the latent space contains an infinity of points which may be mapped to new domain names that are potentially not registered and are created character by character by the decoder.

It is possible to inspect the learned latent dimensions to identify relevant dimensions (e.g. corresponding to the length of the domain, the topic of a domain). This allows to apply controlled modifications to our domains. Similar to the techniques of the first method 600 and the second method 900, the method 1100 may encode multiple domain names to respective latent representations. The method 1100 may begin by obtaining, at 1102, the latent representation of the multiple input domain using the encoder function. The method 1100 may continue by applying, at 1104, desired vector operations to the resulting vectors (addition, subtraction, multiplication, division). The method 1100 may continue by decoding, at 1106, the obtained vector using the decoder function to obtain a new domain name.

Figure 12:
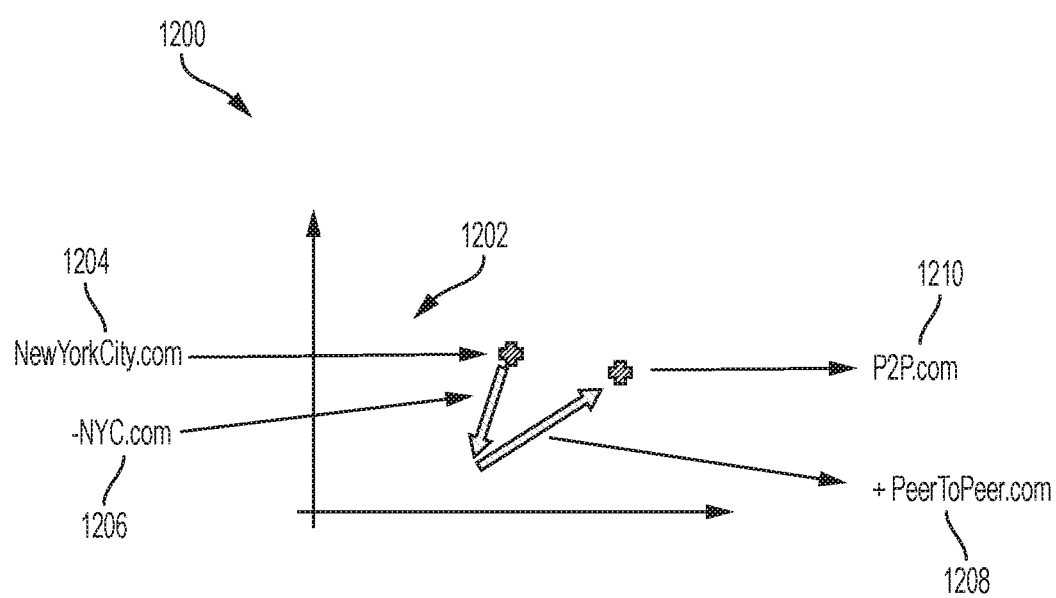
FIG. 12 shows an embodiment of generating a domain name using the third method 1100.

FIG. 12 shows an embodiment of generating a domain name 1200 using the third method 1100. In the latent space 1202, the vector representation for NewYorkCity.com 1204 may be subtracted from the vector representation for NYC.com 1206 and added to the vector representation for PeerToPeer.com 1208, which results in the vector representation for P2P.com 1210. By subtracting the latent representation of the acronym version of a domain name to the original domain name representation, and optionally averaging the resulting domain for several similar embodiment, the vector corresponding to the "acronymize" operation can be obtained and used to apply it to any new encoded domain name.

Figure 13:
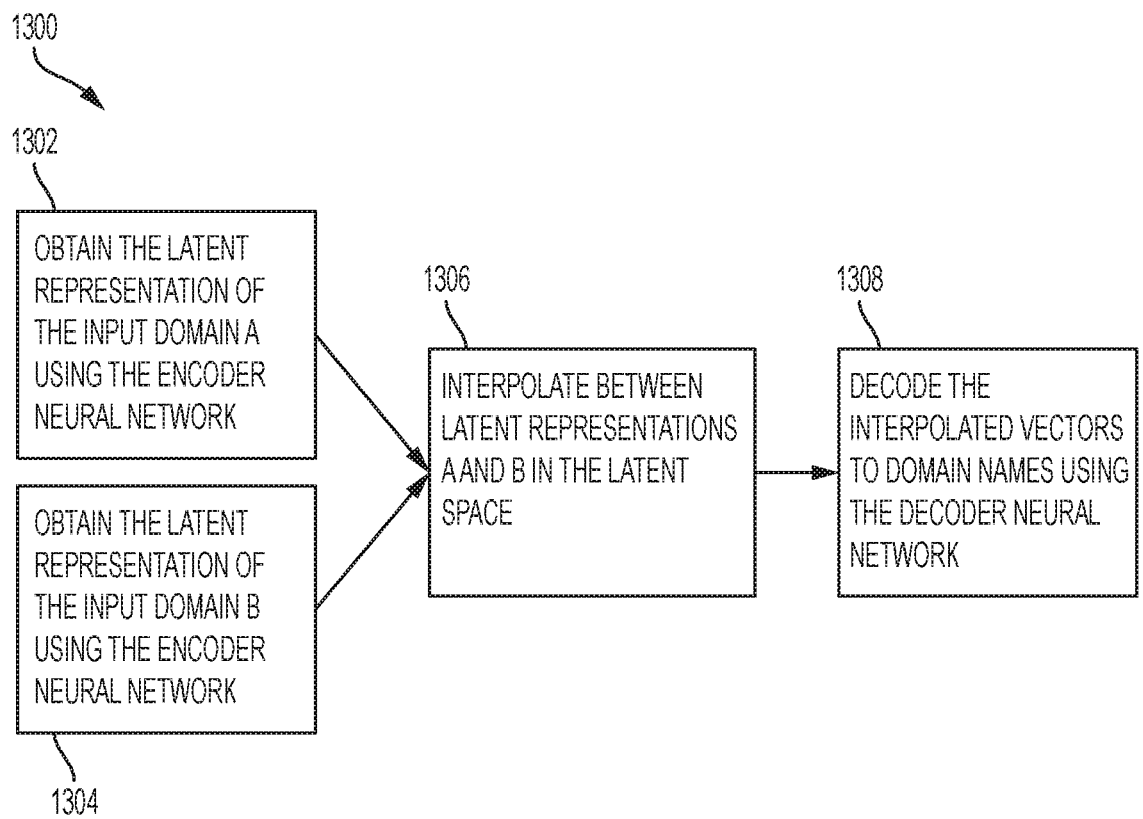
FIG. 13 shows a fourth method 1300 for generating a domain name, according to embodiments of the present disclosure.

FIG. 13 shows a fourth method 1300 for generating a domain name, according to embodiments of the present disclosure. In this embodiment, the domain name that is generated may be a blend of a first input domain name and a second input domain name. Since the latent representation is a continuous vector space, for example, it is possible to interpolate between two domains encoding in the latent space and decode the interpolated vectors to new domains which exhibits features similar to the two input domains. The method 1300 may begin by obtaining, at 1302, the latent representation of a first input domain name using the encoder function and obtaining, at 1304, the latent representation of a second input domain name using the encoder function. The method 1300 may continue by interpolating, at 1306, between a latent representation of the first domain name and a latent representation of the second domain name. The method 1300 may continue by decoding, at 1308, the interpolated vectors to domain names using the decoder function. In some embodiments, the method 1300 can be generalized to more than two domain names by finding their centroid and sampling new vectors around it.

Figure 14:
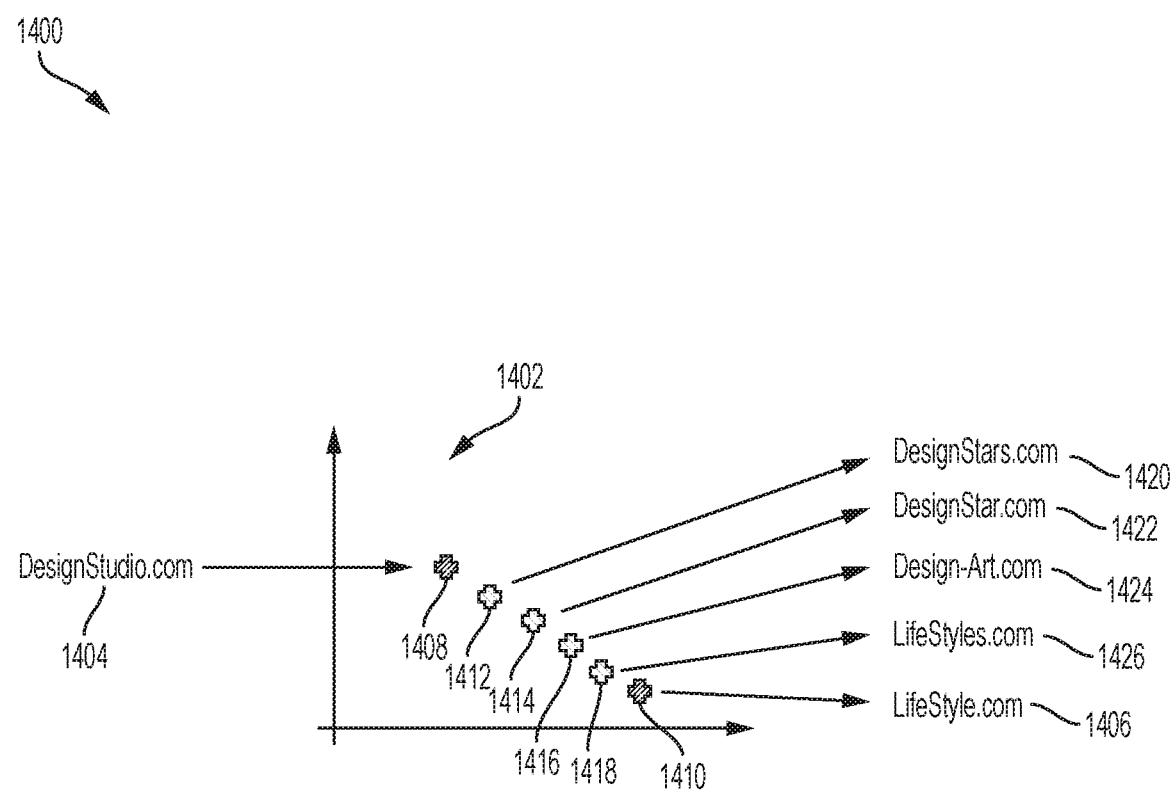
FIG. 14 shows an embodiment of generating a domain name using a first input domain name "DesignStudio.com" 1404 and a second input domain name "LifeStyle.com" 1504 using the fourth method 1300.

FIG. 14 shows an embodiment of generating a domain name 1400 using a first input domain name "DesignStudio.com" 1404 and a second input domain name "LifeStyle.com" 1406 using the fourth method 1300. FIG. 14 show a low dimensional latent space 1402, where the first input domain name "DesignStudio.com" 1404 is encoded as a vector at point 1408 and the second input domain name "LifeStyle.com" 1406 by the encoder as a vector at point 1410 in the latent space 1402. An analysis is then done to sample, identify, or otherwise determine points that are directly and/or approximately between vector at point 1408 and vector at point 1418 in the latent space 1402. For example, the system may identify some of the points lying on the line between the vector at point 1408 and the vector at point 1410. The identified points are then decoded by the decoder to generate one or more additional domain names that the identified vectors represent, which will be syntactically and/or semantically similar to the first input domain name "DesignStudio.com" 1404 and the second input domain name "LifeStyle.com" 1406. For example, vectors at points 1412, 1414, 1416, and 1418 are linearly interpolated between the vectors at point 1408 and point 1410. The decoder can then decode the vector at point 1412 to produce an output domain name "DesignStars.com" 1420, decode the vector at point 1414 to produce an output domain name "DesignStar.com" 1422, decode the vector at point 1416 to produce an output domain name "Design-Art.com" 1424, and decode the vector at point 1418 to produce an output domain name "LifeStyles.com" 1426.

As noted above, the system may produce these outputs or results because of the way the latent space is built to be continuous by enforcing a noisy representation of domain names during training. Interpolating between two latent vectors allows for new relevant domain names to be obtained that share features with both input domain names. In some embodiments, two or more seed domain names can be used to generate a new domain name using the variational autoencoder. In this embodiment, a centroid of a set of two or more seed domain names can be determined in the low-dimensional information-rich latent space and Gaussian noise can be added to a resulting vector to be decoded by the decoder.

FIG. 15 shows an example representation of part of the learned latent space, which is a visualization of two dimensions around a domain name "organicfood.com" and some domain names sampled by varying two dimensions from the encoding of the domain name "organicfood.com". According to an embodiment, although only some points are represented here, the latent space may be continuous and contain an infinity of points, which can be decoded to the discrete domain space. The x-dimension may correspond to the length of the domain name and the y-dimension reflects some more semantic features.

The methods 300, 600, 900, 1100, and 1300 can output the generated domain name(s) for registration. The generated domain names (e.g., the domain names generated in the embodiments of FIGS. 3, 6, 9, 11, and 13) may be output in a variety of ways. According to some embodiments, the generated domain names are output by being displayed on a computer monitor of a user, who is a potential registrant 102. According to some embodiments, the generated domain names are output by being emailed to a selected email address. According to some embodiments, the generated domain names are output by presenting them to a user in the context of a website or application that facilitates registration. Such embodiments may be implemented or provided by, or in coordination with a domain name registrar 110 or domain name registry, which can implement the registration process in the DNS. Such embodiments may present the user with a graphical user interface, e.g., on a web page, by which the user may select a particular domain name from a list of the generated domain names and register it using the same interface. The registration may be accomplished using standard domain name registration techniques. Because the generated domain names are syntactically and/or semantically similar to the seed domain name(s) provided by the user, the list of generated domain names will be shorter and more relevant to the user than domain names suggested by conventional techniques. The shorter, targeted list reduce the amount of time a user would need to choose an appropriate domain name for registration.

Figure 16:
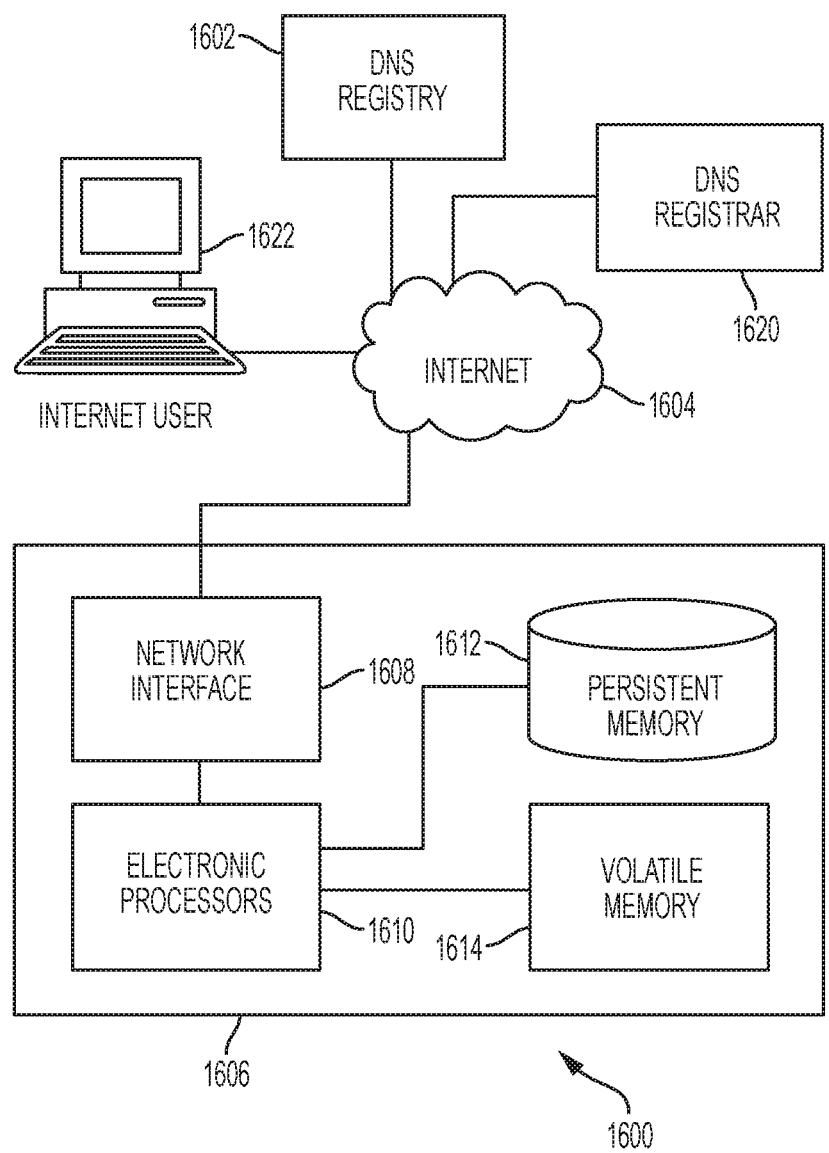
FIG. 16 shows a schematic diagram of a system suitable for implementing methods, according to embodiments of the present disclosure.

FIG. 16 is a schematic diagram of a system 1600 suitable for implementing devices, operations, actions, and methods according to some embodiments. System 1600 may be based around an electronic hardware internet server computer 1606, which may be communicatively coupled to the internet 1604. Server computer 1606 includes network interface 1608 to affect the communicative coupling to the internet 1604. Network interface 1608 may include a physical network interface, such as a network adapter. Server computer 1606 may be a special-purpose computer, adapted for reliability and high-bandwidth communications. Thus, server computer 1606 may be embodied in a cluster of individual hardware server computers, for example. Alternately, or in addition, server computer 1606 may include redundant power supplies. Persistent memory 1612 may be in a Redundant Array of Inexpensive Disk drives (RAID) configuration for added reliability, and volatile memory 1614 may be or include Error-Correcting Code (ECC) memory hardware devices. Server computer 1606 further includes one or more electronic processors 1610, which may be multi-core processors suitable for handling large amounts of information. Electronic processors 1610 are communicatively coupled to persistent memory 1612, and may execute instructions stored thereon to effectuate the techniques disclosed herein, e.g., method 200, 300, 400, 500, 600, 900, 1100, and 1300 as shown and described in reference to FIGS. 2-6, 9, 11, and 13, respectively. Electronic processors 1610 are also communicatively coupled to volatile memory 1614.

Server computer 1606 is communicatively coupled to DNS registry 1602 and/or DNS registrar 1620 according to some embodiments. According to some embodiments, server computer 1606 is provided by a registrar or registry for implementation of the disclosed methods, operations, and devices. According to some embodiments, DNS registry 1602 and/or DNS registrar 1620 may include server computer 1606. The communication between server computer 1606 and DNS registry 1602 or DNS registrar 1620 allows for determining whether generated domain names are currently registered, and also permits users (e.g., internet user 1622) to register unregistered domain names as disclosed herein.

Disclosed embodiments have many advantages and variations. Embodiments are superior to domain name generation techniques that rely on a predefined language of words with a fixed vocabulary. Various embodiments use per-character generation of a trained model using deep-learning, which is not dictionary-backed, which is technically superior because the generated domain names are more focused on an individual's needs and interests than those that are selected or generated by other techniques and have the ability to capture deep contextual relationships at the character-level. Various technical improvements include, but are not limited to, the variational autoencoder domain name generation technique provides fewer and better domain name suggestions, one of which the user is likely to select early in the process. This technique is a technological improvement over prior art domain name generators in that it creates and suggests domain names that are targeted and customized and more relevant for the particular user, which allows a user to find and register a satisfactory domain name more quickly, which reduces bandwidth usage, processor usage, storage, and wasted user time.

Certain embodiments can be performed using a computer program or set of programs. The computer programs can exist in a variety of forms both active and inactive. For example, the computer programs can exist as software program(s) comprised of processor-executable program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer-implemented method of generating an unregistered internet domain name using a trained encoder function and a trained decoder function, the method comprising:
obtaining one or more seed domain names;
mapping, using a hardware processor implementing the trained encoder function, the one or more seed domain names as vector representations in a low-dimensional information-rich latent space;
modifying a representation of one domain name of the one or more seed domain names that is encoded in the low-dimensional information-rich latent space by adding a Gaussian noise to the vector representations of the one or more seed domain names in the low-dimensional information-rich latent space; and
generating, using the hardware processor implementing the trained decoder function, one or more unregistered domain names for domain name registration from the representation that is modified.

2. The method of claim 1, wherein the trained encoder function and the trained decoder function are trained offline using a plurality of domain names extracted from a domain name system (DNS) zone file.

3. The method of claim 1, wherein the trained encoder function comprises a deep convolutional neural network or a recurrent neural network using character level information from the one or more seed domain names.

4. The method of claim 1, wherein the trained decoder function comprises a deep recurrent neural network, wherein the one or more new domain names are generated at a character level from a latent vector.

5. The method of claim 1, further comprising varying a dimension of the vector representations of the one or more seed domain names in the low-dimensional information-rich latent space, wherein the dimension that is varied encodes a feature comprising a length of a seed domain name from the one or more seed domain names, a topic of the seed domain name, a syntactic characteristic of the seed domain name, or combinations thereof.

6. The method of claim 1, further comprising applying one or more vector operations to the vector representations in the low-dimensional information-rich latent space.

7. The method of claim 1, wherein the generating further comprises decoding vector representations that were generated in the low-dimensional information-rich latent space to yield the one or more new domain names.

8. The method of claim 1, wherein the one or more unregistered domain names are syntactically and semantically similar to one of the one or more seed domain names.

9. The method of claim 1, wherein the obtaining the one or more seed domain names comprises:
providing a web page for registering domain names;
accepting the one or more seed domain names as an input from a web page visitor; and
displaying the one or more new domain names for one of the one or more seed domain names in response to the web page.

10. A computer-implemented method of generating an unregistered internet domain name using a trained encoder function and a trained decoder function, the method comprising:
obtaining one or more seed domain names;
mapping, using a hardware processor implementing the trained encoder function, the one or more seed domain names as vector representations in a low-dimensional information-rich latent space;
modifying a representation of one domain name of the one or more seed domain names that is encoded in the low-dimensional information-rich latent space; and
generating, using the hardware processor implementing the trained decoder function, one or more unregistered domain names for domain name registration from the representation that is modified by interpolating between a first vector representation of a first seed domain name and a second vector representation of a second seed domain name in the low-dimensional information-rich latent space.

11. The method of claim 10, wherein the trained encoder function and the trained decoder function are trained offline using a plurality of domain names extracted from a domain name system (DNS) zone file.

12. The method of claim 10, wherein the trained encoder function comprises a deep convolutional neural network or a recurrent neural network using character level information from the one or more seed domain names.

13. A computer-implemented method of generating an unregistered internet domain name using a trained encoder function and a trained decoder function, the method comprising:
obtaining one or more seed domain names;
mapping, using a hardware processor implementing the trained encoder function, the one or more seed domain names as vector representations in a low-dimensional information-rich latent space;
modifying a representation of one domain name of the one or more seed domain names that is encoded in the low-dimensional information-rich latent space by determining a centroid of a set of two or more seed domain names in the low-dimensional information-rich latent space and applying Gaussian noise to a vector representation of the centroid; and
generating, using the hardware processor implementing the trained decoder function, one or more unregistered domain names for domain name registration from the representation that is modified.

14. The method of claim 13, wherein the trained encoder function and the trained decoder function are trained offline using a plurality of domain names extracted from a domain name system (DNS) zone file.

15. The method of claim 13, wherein the trained encoder function comprises a deep convolutional neural network or a recurrent neural network using character level information from the one or more seed domain names.

16. A non-transitory computer-readable medium comprising instructions that when executed by a hardware processor cause the hardware processor to perform a method of generating unregistered internet domain names using a trained encoder function and a trained decoder function, the method comprising:
obtaining one or more seed domain names;
mapping, using the trained encoder function, the one or more seed domain names as vector representations in a low-dimensional information-rich latent space;
modifying a representation of one domain name of the one or more seed domain names that is encoded in the low-dimensional information-rich latent space by adding a Gaussian noise to the vector representations of the one or more seed domain names in the low-dimensional information-rich latent space; and
generating, using the trained decoder function, one or more unregistered domain names for domain name registration from the representation that is modified.

17. The non-transitory computer-readable medium of claim 16, wherein the trained encoder function and trained decoder function are trained offline using a plurality of domain names extracted from a domain name system (DNS) zone file.

18. The non-transitory computer-readable medium of claim 16, wherein the trained encoder function comprises a deep convolutional neural network or a recurrent neural network using character level information from the one or more seed domain names.

19. The non-transitory computer-readable medium of claim 16, wherein the trained decoder function comprises a deep recurrent neural network, wherein the one or more new domain names are generated at a character level from a latent vector.

20. A computer system comprising:
a hardware processor;
a non-transitory computer readable medium storing instructions that when executed by the hardware processor perform a method of generating unregistered internet domain names using a trained encoder function and a trained decoder function, the method comprising:
obtaining one or more seed domain names;
mapping, using the hardware processor implementing the trained encoder function, the one or more seed domain names as vector representations in a low-dimensional information-rich latent space;
modifying a representation of one domain name of the one or more seed domain names that is encoded in the low-dimensional information-rich latent space by adding a Gaussian noise to the vector representations of the one or more seed domain names in the low-dimensional information-rich latent space; and
generating, using the hardware processor implementing the trained decoder function, one or more unregistered domain names for domain name registration from the representation that is modified.

* * * * *